(No Model.)
W. KUHN.
APPARATUS FOR THE PASTEURIZATION OF BEER AND OTHER LIQUIDS.
No. 412,632. Patented Oct. 8, 1889.
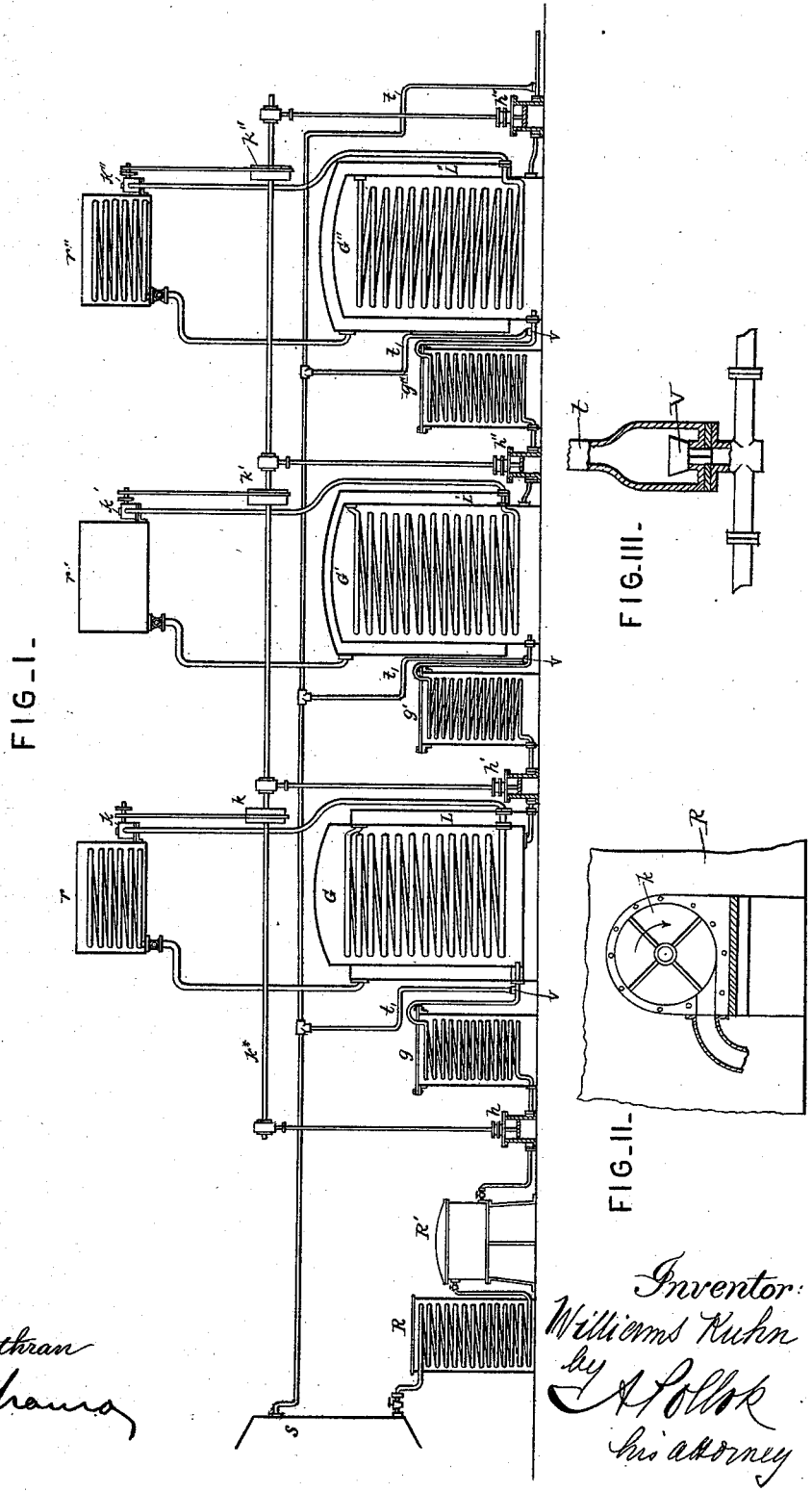

UNITED STATES PATENT OFFICE.

WILLIAMS KUHN, OF CLERMONT-FERRAND, FRANCE.

APPARATUS FOR THE PASTEURIZATION OF BEER AND OTHER LIQUIDS.

SPECIFICATION forming part of Letters Patent No. 412,632, dated October 8, 1889.

Application filed May 1, 1889. Serial No. 309,194. (No model.)

*To all whom it may concern:*

Be it known that I, WILLIAMS KUHN, a citizen of the Republic of France, and a resident of Clermont-Ferrand, in the said Republic, have invented certain new and useful Improvements in Apparatus for the Pasteurization of Beer and other Liquids, of which the following is a full, clear, and exact description.

This invention relates to the pasteurization of beer and other fermentable or gas-containing liquids—such as wine, milk, or mineral waters—in large quantities in a continuous manner, the liquid being caused to flow successively under pressure without loss of gas through heating and cooling vessels adapted rapidly to impart the necessary temperatures.

In the accompanying drawings a sectional elevation is given in Figure I of apparatus for effecting such pasteurization. Fig. II is a detail view of one of the pumps for circulating the heating and cooling media, and Fig. III a detail view of one of the safety-valves. It will of course be understood that the particular construction illustrated of these devices is no part of the invention.

From the tun or vat $s$ the beer or other liquid passes through a refrigerator R, wherein it is made ice-cold, and thence through a filter R' on its way to the apparatus for heating the cooled and filtered beer to a pasteurizing temperature and afterward cooling the same. The vessels for heating and cooling are or may be made alike, and, as shown, comprise each a receptacle G G' G'', respectively, for the beer and a coil for the heating or cooling medium, the length and diameter of the coil being nearly equal to the corresponding dimensions of the receptacles, so as to distribute the said medium to all parts of said receptacles. Each apparatus also has a jacket L L' L'', respectively, with which the outlet of the coil communicates, so as to deliver the heating or cooling medium which has passed through the coil into the jacket. Each of the three jacketed and coil-holding receptacles is preceded by a coil $g$ $g'$ $g''$, in which the beer circulates. Moreover, a pump $h$ is placed between the tun $s$ and the first apparatus, a second pump $h'$ between the first and second apparatus, a third pump $h''$ between the second and third apparatus, and a fourth pump $h'''$ between the third apparatus and the casks for transport. The same shaft $k^*$ is designed to work all the pumps, so that the beer drawn from the tun by the pump $h$ traverses the coil $g$, immersed in water heated to the desired degree. It is heated therein and is pasteurized in the apparatus G. The second pump $h'$ draws the beer thus pasteurized and forces it into the second coil $g'$, immersed in cold water, then into the apparatus G', wherein cold water also circulates. Lastly, the third pump $h''$ causes the beer to pass at the temperature of cold water from the apparatus G' and forces it through the coil and apparatus $g''$ G'', wherein the non-congealable liquid of an ice-machine circulates, and where the beer returns to its normal degree and pressure, in order to be subsequently forced into the casks for transport by the fourth pump.

Each of the three reservoirs for hot water $r$, cold water $r'$, and non-congealable liquid $r''$ is connected with the apparatus and the corresponding coil by a helicoidal pump $k$, $k'$, or $k''$, so that the same liquid will constantly cool or heat the corresponding apparatus and be regenerated in its reservoir, wherein either a steam-coil, as in $r$, is employed or wherein non-congealable liquid is caused to circulate, as in $r''$. In all the passages and between every two pumps are arranged safety-valves V, provided with escape-pipes $t$, in order to cause the beer to pass back to the first tun in case of any difference in the operation or in the supply of the pumps. In this manner the outflow of beer will be continuous, and yet each apparatus constitutes a closed vessel in which the beer may be maintained under pressure, because the valve of one pump is always closed when that of the preceding or following pump is open, so that by this means no carbonic acid is allowed to escape. In this arrangement the apparatus G G' G'' may be horizontal, as in my application of even date herewith.

As shown herein, the receptacles are placed upright. With such receptacles it is preferred to have the jacket L for the heating medium surround the lower part of the receptacle G and the jackets L' L'' for the cooling medium surround the upper part of the corresponding receptacles G' G'', since in this way the heating or cooling, as the case may be, tends to create currents which favor the diffusion of the liquids. This arrangement of the jackets or casings constitutes a special feature of invention, applicable generally to vessels for pasteurizing by heating in one apparatus or receptacle and cooling in a subsequent receptacle or receptacles.

I claim as my invention or discovery—

1. The series of connected apparatus for continuous pasteurization under pressure, composed of a number of receptacles provided each with an inlet and an outlet for the beer or other liquid to be pasteurized, and with a close coil therein nearly equal in length and diameter to the inclosing-receptacle, in combination with connecting-pipes from the outlet of each preceding to the inlet of each succeeding receptacle, force-pumps, one in the inlet-pipe of the first receptacle of the series and others in the said connecting-pipes, safety-valves, one for each receptacle, having each its supply-passage in communication with the interior of its appropriate receptacle, and means for supplying the coil of the first receptacle with a heating and of each of the others with a cooling medium, substantially as described.

2. The series of apparatus for pasteurization, having pipes connecting the outlet of each preceding with the inlet of the succeeding apparatus, in combination with the tun, the refrigerator, the filter, the force-pump, and the pipes connecting the tun with the refrigerator, the latter with the filter, the filter with the force-pump, and the latter with the first of said apparatus, substantially as described.

3. The series of three connected apparatus for continuous pasteurization under pressure of beer and other liquids, each apparatus being composed of a receptacle and an inclosed coil, and the outlet of each preceding receptacle being in communication by a connecting-pipe with the inlet of the succeeding receptacle, in combination with a supply-pipe for the first and a discharge-pipe for the last apparatus of the series, force-pumps in said connecting and supply pipes, safety-valves having their respective supply-passages in communication with the interiors of the respective receptacles, three reservoirs for hot water, for cold water, and for incongealable liquid, respectively, pipes connecting the reservoir of hot water with the coil of the first apparatus, the reservoir of cold water with the coil of the second apparatus, and the reservoir of incongealable liquid with the coil of the third apparatus, and circulating-pumps connected with said last-mentioned pipes, substantially as described.

4. The combination, with the three apparatus, each composed of a close coil and an inclosing-receptacle provided with an inlet and an outlet, of a coil and force-pump for each apparatus, pipes connecting the coil last mentioned and its force-pump with each other, pipes connecting the discharge of each force-pump with the inlet of the appropriate receptacle, pipes connecting the inlet of the preceding receptacle with the supply of the force-pump for the succeeding apparatus, a reservoir for each apparatus, pipes connecting each reservoir with the first-mentioned coil of the appropriate apparatus, and pumps connected with the last-mentioned pipes, substantially as described.

5. The series of connected apparatus, each comprising a receptacle, a safety-valve, a jacket for said receptacle, and a coil in said receptacle, in combination with the pumps and connecting-pipes for forcing the beer through the receptacles and the pumps and reservoirs in communication with said coils and jackets, substantially as described.

6. A series of apparatus having jacketed receptacles, the jackets or casings being placed around the lower part of the first receptacle of the series and around the upper part of the balance of said receptacles, in combination with the supply-pipe for the first apparatus, the discharge-pipe for the last apparatus, the connecting-pipes between the different apparatus, and the means or connections for supplying the jacket of the first apparatus with a heating and that of each succeeding apparatus with a cooling medium, substantially as described.

In testimony whereof I have signed this specification in the presence of two subscribing witnesses.

WILLIAMS KUHN.

Witnesses:
PAUL GIRAL,
R. J. PRESTON.